US012270247B2

(12) United States Patent
Kornish

(10) Patent No.: US 12,270,247 B2
(45) Date of Patent: Apr. 8, 2025

(54) INTERLOCKING TABS AND OPENINGS FOR AN ENDCAP OF A MOVABLE BARRIER

(71) Applicant: Overhead Door Corporation, Lewisville, TX (US)

(72) Inventor: Dwayne J. Kornish, Navarre, OH (US)

(73) Assignee: Overhead Door Corporation, Lewisville, TX (US)

( * ) Notice: Subject to any disclaimer, the term of this patent is extended or adjusted under 35 U.S.C. 154(b) by 186 days.

(21) Appl. No.: 18/149,452

(22) Filed: Jan. 3, 2023

(65) Prior Publication Data

US 2024/0218729 A1 Jul. 4, 2024

(51) Int. Cl.
*E06B 3/88* (2006.01)
*E06B 3/70* (2006.01)

(52) U.S. Cl.
CPC ........ *E06B 3/88* (2013.01); *E06B 2003/7044* (2013.01)

(58) Field of Classification Search
CPC ...... E06B 3/88; E06B 2003/7044; E06B 3/76; E06B 3/485
See application file for complete search history.

(56) References Cited

U.S. PATENT DOCUMENTS 3,740,916 A 6/1973 Kenaga
4,284,119 A * 8/1981 Martin .................... E06B 3/485 52/794.1
4,347,653 A * 9/1982 Martin .................... E06B 3/485 29/458
RE31,461 E * 12/1983 Martin .................... E06B 3/485 29/458
4,492,067 A * 1/1985 Martin .................... E06B 3/485 52/784.1
7,014,386 B1 3/2006 Mullet

FOREIGN PATENT DOCUMENTS

EP 0722530 B1 7/1996

OTHER PUBLICATIONS

Amarr, Hillcrest, photographs of garage door taken between Sep. 12, 2022 and Jan. 4, 2023, 3 pages.
Clopay, Model 4050, photographs of garage door taken between Jan. 6, 2022 and Jan. 13, 2022, 3 pages.

* cited by examiner

*Primary Examiner* — Rodney Mintz
(74) *Attorney, Agent, or Firm* — Haynes and Boone, LLP

(57) ABSTRACT

An endcap of a movable barrier is configured to enclose an end of the movable barrier. The endcap includes an endcap wall alignable with a surface of the movable barrier. The endcap wall includes a tab alignable with an opening of the movable barrier. When the tab is aligned with the opening of the movable barrier, the tab is folded through the opening of the movable barrier. The shape of the tab corresponds to the shape of the opening of the movable barrier such that when the tab is folded through the opening, the endcap is affixed to the movable barrier.

20 Claims, 9 Drawing Sheets

INTERLOCKING TABS AND OPENINGS FOR AN ENDCAP OF A MOVABLE BARRIER

TECHNICAL FIELD

The present disclosure relates generally to the field of movable barriers. In particular, a set of interlocking tabs is positioned within an endcap of a movable barrier which may be folded through a corresponding opening of a section of the movable barrier, coupling the endcap to the section.

BACKGROUND

Movable barriers, such as upward-acting sectional or single panel garage doors, residential and commercial rollup doors, and slidable and swingable gates, are used to alternatively allow and restrict entry to building structures and property. An upward-acting slidable barrier typically includes rollers positioned on either side of the barrier which roll along a track.

Upward-acting sectional garage doors typically include several horizontal sections. Each horizontal section includes various hardware for connecting sections to one another and securing the sections to the tracks. For example, sections are typically attached to one another via hinges, with at least one hinge on either side. Each section also includes roller holders for housing a roller which attaches the movable barrier to the tracks on either side of the door. In some aspects, the sections of a garage door may be constructed of materials that do not have sufficient strength to bind to fasteners coupling necessary hardware, such as the hinges and roller holders, to the door. While stronger materials may be used, these materials are typically too expensive and/or heavy for use in most upward-acting sectional garage doors.

In some aspects, endcaps may be attached to both right and left ends of each section and enclose the ends of the section. These endcaps provide added strength to the sections of the garage door without contributing significant added weight to the door. Securing endcaps to sections of a garage door is a labor-intensive process and may require specialized tools. In addition, traditional forms of securing endcaps to sections of a garage door require additional hardware are prone to failure, particularly if disassembly and later reassembly of the garage door section is later required, for example, for maintenance.

SUMMARY

In an exemplary aspect, an endcap configured to enclose an end of a movable barrier is provided. The endcap includes an endcap wall alignable with a surface of the movable barrier, the wall comprising: a first tab extending from the wall and alignable with a first opening of the movable barrier, wherein the first tab is foldable within the first opening of the movable barrier in a manner connecting the endcap to the movable barrier.

In some aspects, the endcap includes a second tab alignable with the opening of the movable barrier, the first tab and the second tab forming a first set of tabs, and the first tab and the second tab each foldable within the opening of the movable barrier. In some aspects, the wall further comprises a second set of tabs alignable with a second opening of the movable barrier, wherein the second set of tabs are foldable within the second opening of the movable barrier. In some aspects, a shape of the first tab corresponds to a shape of the opening of the movable barrier, such that when the first tab is folded within the opening, the endcap is affixed to the movable barrier. In some aspects, the first tab includes a base and a crown, wherein a width of the crown is greater than a width of the base. In some aspects, when the endcap is aligned with the movable barrier, the width of the base of the first tab is equal to a length of a chord extending across the opening of the movable barrier at a corresponding position of the base of the first tab. In some aspects, at least one hole of the plurality of holes is alignable with a hinge.

In an exemplary aspect, a movable barrier is provided. The movable barrier includes a section comprising: an end; an outer surface corresponding to an exterior side of the movable barrier; and an inner surface opposite the outer surface and corresponding to an interior side of the movable barrier, the inner surface including a first hole; and an endcap comprising: a first wall configured to overlap the end of the section; a second wall configured to overlap a portion of the outer surface of the section; and a third wall configured to overlap a portion of the inner surface of the section, the third wall comprising a first set of folding tabs sized and positioned to align with the first hole and foldable through the first hole to affix the endcap to the section.

In some aspects, the movable barrier includes a second set of folding tabs sized and positioned to align with a second hole within the inner surface of the section, the second set of folding tabs configured to be foldable through the second hole. In some aspects, the first set of tabs includes at least two tabs. In some aspects, a shape of the first hole is a rounded diamond comprising two ends. In some aspects, each tab of the first set of tabs includes a base and a crown, each base alignable with an end of the first hole. In some aspects, a width of the base of each tab of the first set of tabs corresponds to a chord of the first hole. In some aspects, the endcap further comprises a plurality of holes configured to receive a corresponding plurality of fasteners to further affix the endcap to the movable barrier. In some aspects, the movable barrier further includes a hinge coupled to the endcap.

In an exemplary aspect, a method of affixing an endcap to a movable barrier is provided. The method includes positioning the endcap relative to the movable barrier such that the endcap encloses an end of the movable barrier; aligning a first set of tabs of the endcap with a first hole of the movable barrier; and folding the first set of tabs of the endcap through the first hole of the movable barrier.

In some aspects, the method further includes aligning a second set of tabs of the endcap with a second hole of the movable barrier; and folding the second set of tabs of the endcap through the second hole of the movable barrier. In some aspects, each tab of the first set of tabs includes a base and a crown. In some aspects, a width of a crown of each tab of the first set of tabs is greater than: a width of a base of each tab of the first set of tabs; and a length of a chord of the first hole.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any implementation or aspect may be combinable with one or more features of other implementation or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
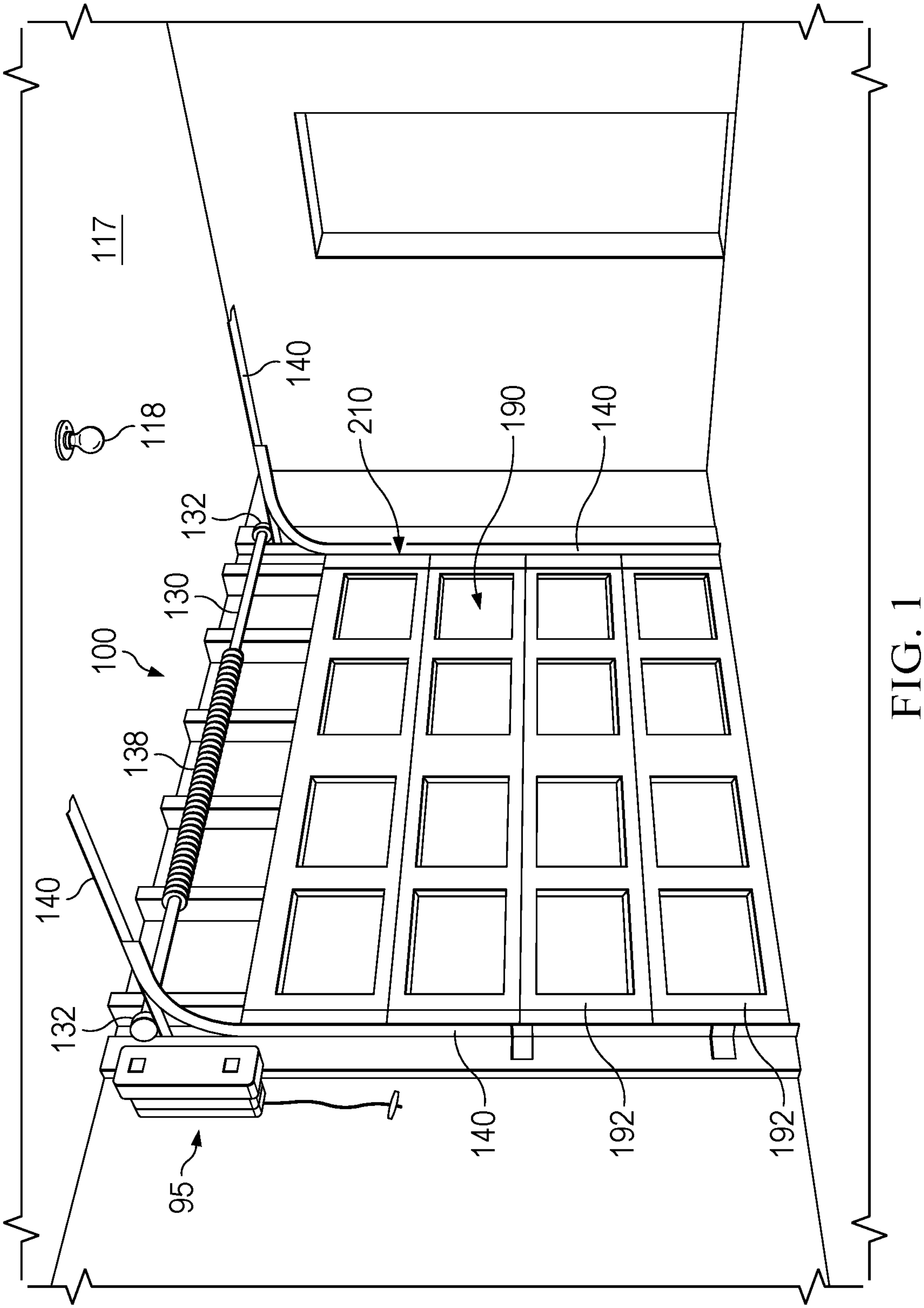
FIG. 1 is a perspective illustration of a movable barrier system, according to aspects of the present disclosure.

These Figures will be better understood by reference to the following Detailed Description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

In some aspects, the present disclosure relates to a set of tabs within an endcap for a movable barrier which may be folded through a corresponding opening of a section of the movable barrier. The tabs interlock with the corresponding opening securing the endcap to the movable barrier. Specifically, a wall of the endcap includes a hole. Multiple tabs may extend from the outer edge of the hole toward the center of the hole. In some examples, each tab includes a base and a crown. The base of each tab may be the proximal portion of the tab which extends from the outer edge of the hole. The crown of each tab may be the distal end of the tab extending into the center of the hole. The tabs are positioned over the corresponding opening of the section. The shape of the hole may be selected such that each rounded corner of the opening corresponds to the width of the base of each tab. In some examples, the width of the crown of each tab may be greater than the width of the base. As a result, when the tab is folded through the hole of the section, the tab cannot be moved out of the hole. Thus, the tabs of the endcap may interlock with the hole of the section, securing the endcap to the section.

FIG. 1 is a perspective illustration of a movable barrier system, according to aspects of the present disclosure. In this example, the movable barrier is an upward acting garage door. In some examples, the movable barrier may be a sectional-type garage door. FIG. 1 illustrates a movable barrier 190 and a barrier operator 95. In some implementations, the movable barrier 190 may include multiple sections 192. In some implementations, the sections 192 make up the movable barrier 190. For example, in FIG. 1, the movable barrier 190 may include four sections 192 arranged vertically. In some aspects, the sections 192 may include various panels which may be transparent or non-transparent allowing light into the interior space of the movable barrier system.

In some implementations, the movable barrier system 100 described herein may be referred to as a barrier system, a door system, a garage door system, a gate system, or any other similar term. In some implementations, the movable barrier 190 may be referred to as a barrier, a door, a garage door, a sectional garage door, an upward acting garage door, a gate, a movable gate, a sliding gate, or any other similar term. In some implementations, the barrier operator 95 may alternatively be referred to as an operator, a door operator, a garage door operator, a gate operator, an opener, a door opener, a garage door opener, a gate opener, a control system, or any other similar term. In some implementations, the light fixture 118 may be referred to as a light, a light system, or any other similar term.

FIG. 1 shows that the movable barrier 190 provides access to a space or a room having a ceiling 117 and the light fixture 118 that is spaced from the barrier operator 95. The movable barrier 190 may provide selective access to the space. The barrier operator 95 may be any suitable type of barrier operator. For example, in some implementations, the barrier operator 95 may be a jackshaft operator. In other implementations, the barrier operator 95 may be a direct drive wall or ceiling mounted operator, a belt driven operator, a chain driven operator, a screw drive operator, a trolley operator, a carriage operator, or any other type of barrier operator. The barrier operator 95 may include any suitable components. As shown in FIG. 1, the barrier operator 95 may be disposed adjacent the movable barrier 190. For example, in the implementation shown, the barrier operator 95 may be positioned on the same wall as the opening covered by the movable barrier 190. However, the barrier operator 95 may be positioned at any other location within the room shown in FIG. 1. For example, the barrier operator 95 may be affixed to the ceiling 117. In some implementations, the barrier operator 95 may be positioned on a different wall of the room or on the floor of the room. In some implementations, particularly in an implementation in which the barrier operator 95 is affixed or otherwise positioned on the ceiling 117 of the room, the light fixture 118 may be attached to, or a part of, the barrier operator 95.

Any suitable structures or components may be implemented to facilitate movement of the movable barrier 190 between a closed position and an open position. In the example shown in FIG. 1, the movable barrier 190 may be moved along one or more tracks 140. Additionally shown in FIG. 1 is a shaft 130, cable drums 132, and a torsion spring 138.

FIG. 1 illustrates the movable barrier 190 as an upward acting sectional door being movable between open and closed positions along the tracks 140. The tracks 140 may be affixed to either side of the opening of the movable barrier 190. In some implementations, the tracks 140 may be affixed to the wall of the room shown in FIG. 1 and/or the ceiling 117. In some implementations, the movable barrier 190 may include one or more rolling or sliding components on either side sized and shaped to fit within and move in a longitudinal direction along the tracks 140. The rolling or sliding components may be affixed to the brackets positioned on either side of the movable barrier 190.

Components of the movable barrier system 100 shown in FIG. 1 may include any other suitable components. For example, the movable barrier system 100 may include rollers positioned on the movable barrier 190 or the tracks 140. The system 100 may include sensors, such as safety sensors configured to detect the presence or motion of an object or person, seals positioned along any portion of the movable barrier 190 or the corresponding opening, tracks, cables, or tube shafts. The system may include extension springs to further reduce necessary rotational force of a motor, a motor rail, belts, motor head, motor arms, lift handles for manual operation, emergency release ropes, or any other suitable components.

The movable barrier 190 may include any number of sections 192. For example, the movable barrier 190 may include a number of sections 192 greater or less than those shown in FIG. 1. Two hinges 200 may rotatably affix sections 192 to one another. These hinges 200 may include roller tubes configured to receive the stem of a roller positioned within either of the tracks 140.

Figure 2:
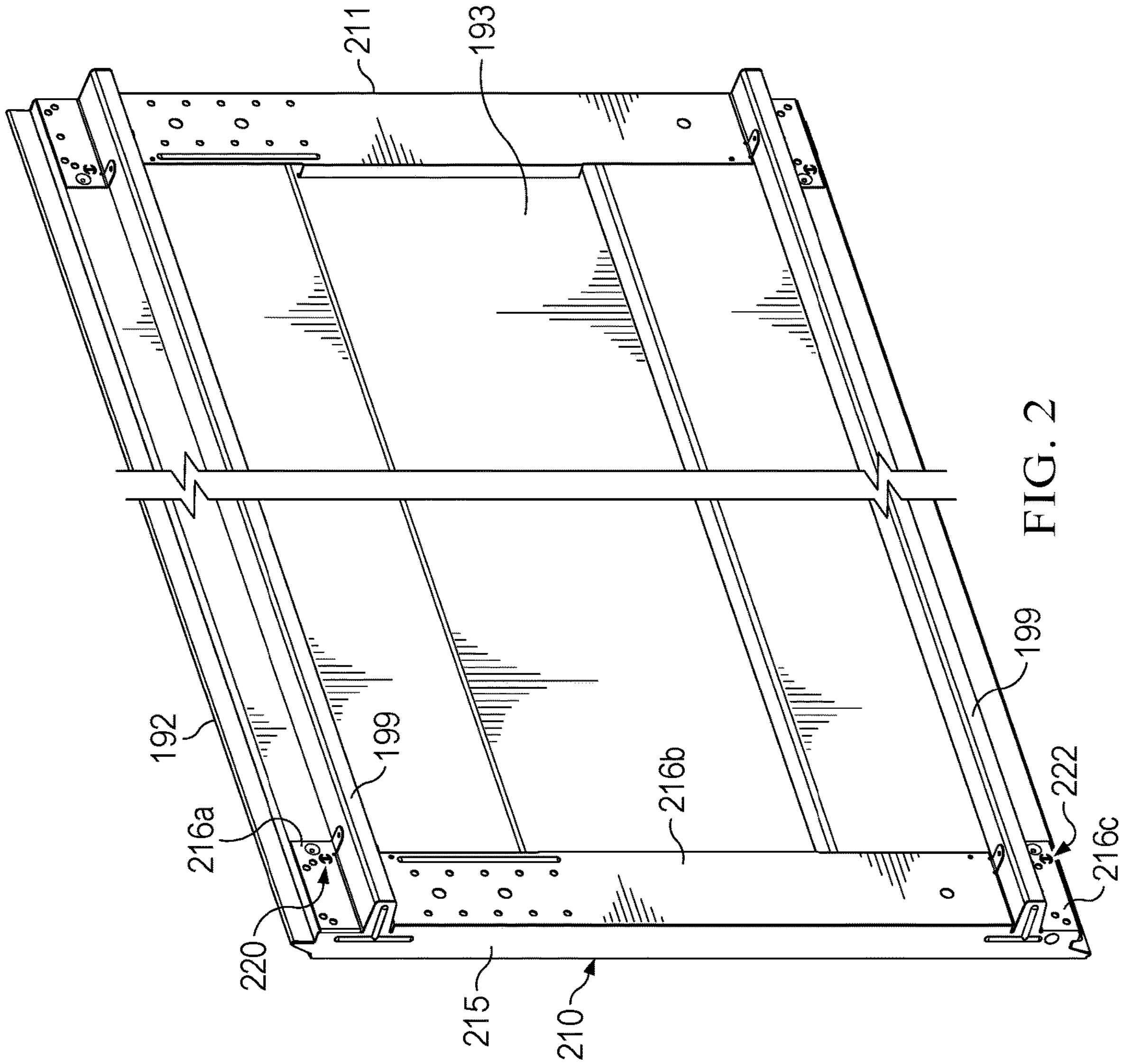
FIG. 2 is a perspective view of an interior side of a section of a movable barrier, according to aspects of the present disclosure.

FIG. 2 is a perspective view of an interior side of a section 192 of a movable barrier, according to aspects of the present disclosure. The view of the section 192 shown in FIG. 2 illustrates a left and right end of the section 192. As shown, two endcaps are affixed to each end the section 192, including a left endcap 210 and a right endcap 211. Aspects of the endcaps are shown and described with reference to the left endcap 210. However, any aspects described with reference to the left endcap 210 may apply equally to the right endcap 211. For example, the right endcap 211 may be symmetrical to or a mirror image of the left endcap 210.

Figure 3A:
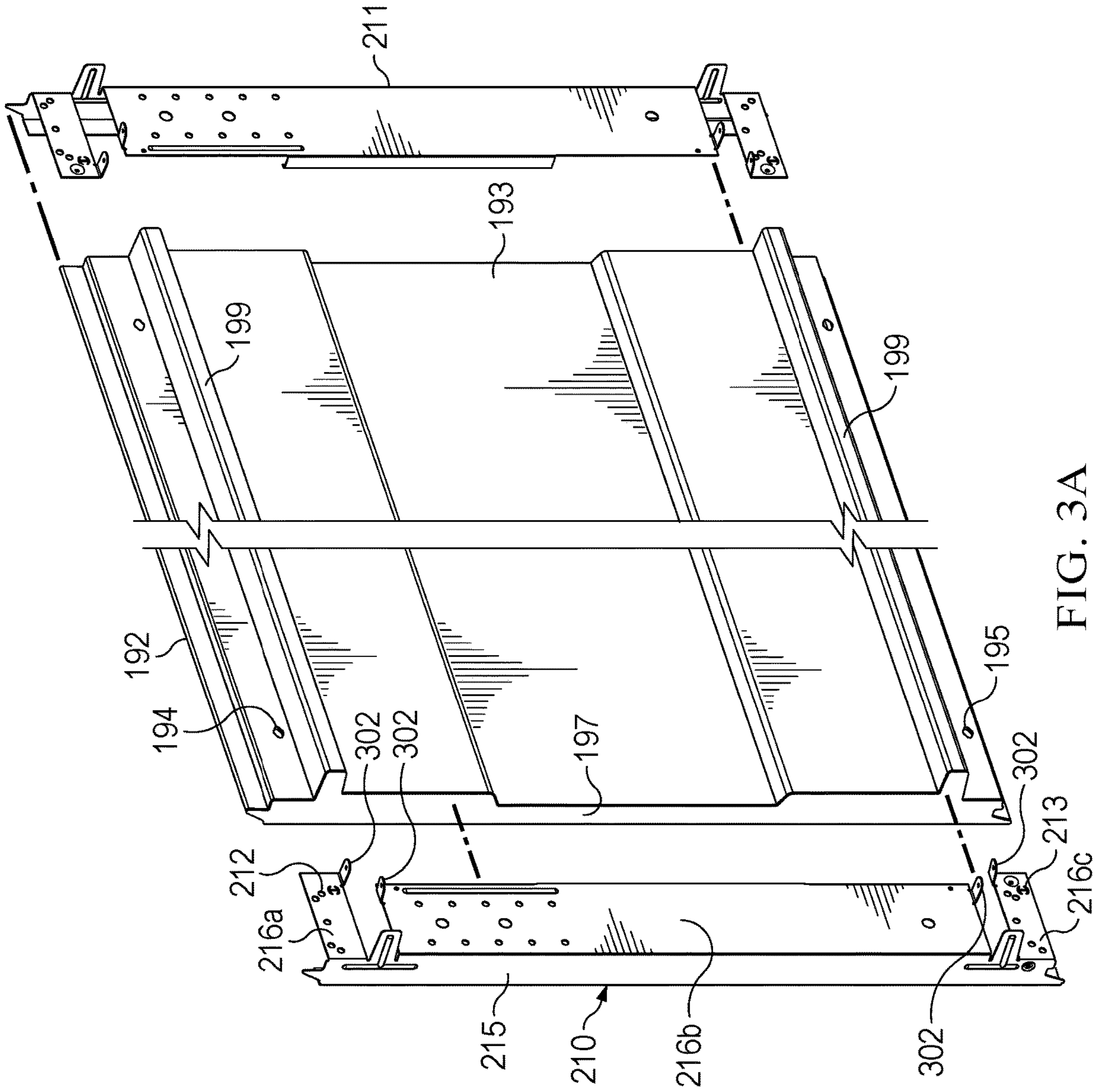
FIG. 3A is an exploded perspective view of an interior side of a section of a movable barrier, according to aspects of the present disclosure.
Figure 3B:
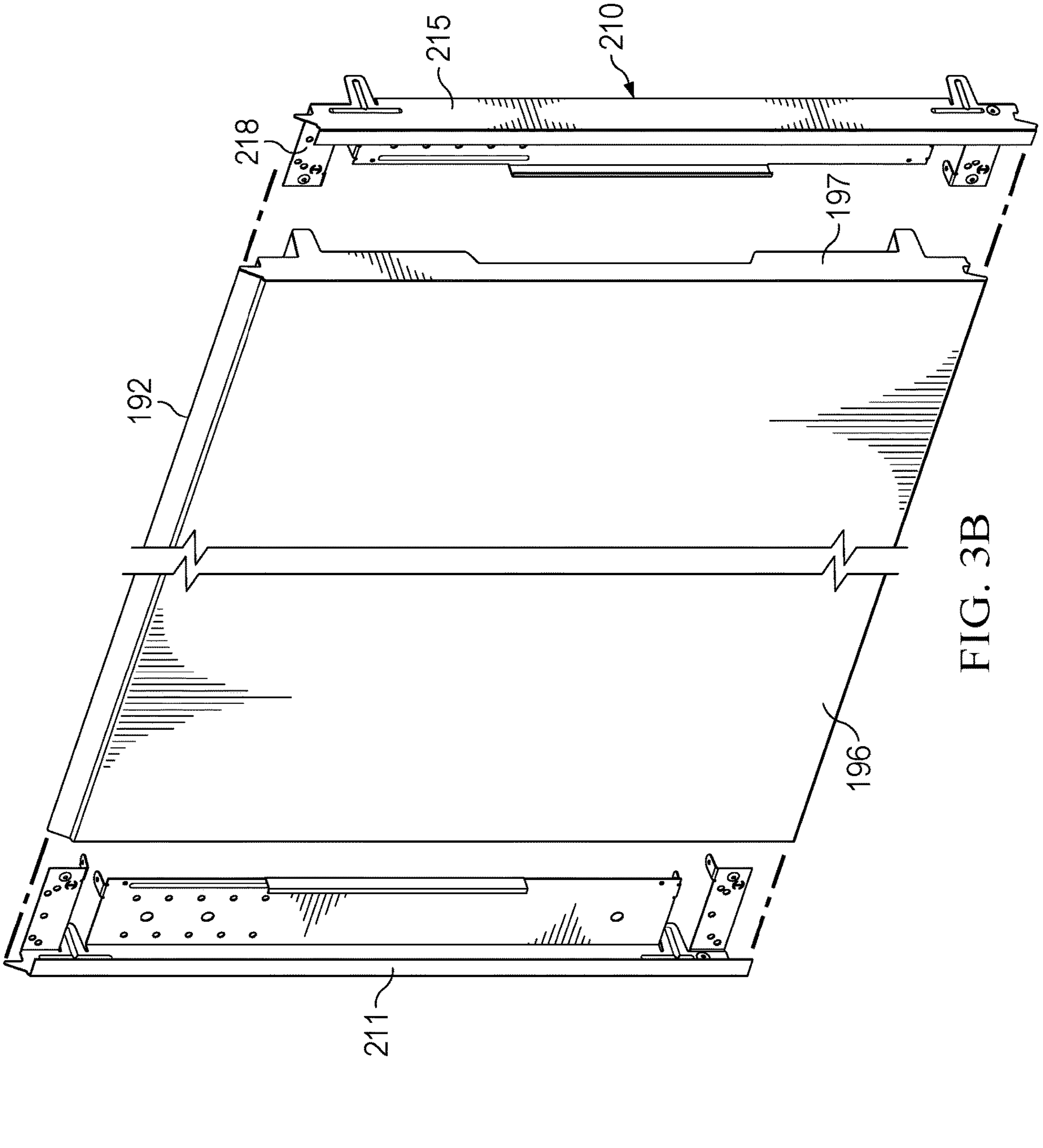
FIG. 3B is an exploded perspective view of an exterior side of a section of a movable barrier, according to aspects of the present disclosure.

The left endcap 210 includes a wall 215, a wall 216*a*, a wall 216*b*, a wall 216*c*, and a wall 218 (see FIG. 3B). These walls of the left endcap 210 may enclose the left end of the section 192. For example, the section 192 may include an inner surface 193, an outer surface 196 (see FIG. 3B), and an end 197 (see FIG. 3A). As shown in FIG. 2, the endcap 210 may be aligned with the section 192 such that the wall 215 of the endcap 210 overlaps the end 197. In some aspects, the shape of the wall 215 may correspond to the shape of the end 197 of the section 192. For example, the wall 215 may completely overlap or cover every part of the end 197. In some aspects, the wall 215 may be sized and shaped to partially overlap a portion of the end 197 of the section 192.

In some aspects, any of the walls 216*a*, 216*b*, or 216*c* may overlap an end portion of the inner surface 193 of the section 192. For example, the inner surface 193 may include two protrusions 199 extending horizontally along the inner surface 193. The protrusions 199 may divide the inner surface 193 into an upper region, a central region, and a lower region. For example, the upper protrusion 199 may separate the upper region of the inner surface 193 from the central region. Similarly, the lower protrusion 199 may separate the lower region of the inner surface 193 from the central region.

The wall 216*a* of the endcap 210 may overlap a leftmost portion of the inner surface 193 of the section 192. The wall 216*a* may overlap a leftmost portion of the upper region of the inner surface 193, as shown in FIG. 2. The wall 216*b* may overlap a leftmost portion of the central region of the inner surface 193. The wall 216*c* may overlap a leftmost portion of the lower region of the inner surface 193.

As shown in FIG. 2, the endcap 210 may include several holes. For example, the walls 216*a*, 216*b*, and 216*c* may each include multiple holes. These holes may be sized and shaped to receive fasteners which may be driven through the holes of the endcap 210 into the section 192. In some aspects, these fasteners may be used to further affix the endcap 210 to the section 192 in addition to the locking features described hereafter. In some aspects, these fasteners and corresponding holes may be configured to affix various hardware to the endcap 210 and/or the section 192. For example, in some aspects, a portion of a hinge may be affixed to the wall 216*a* via any of the holes shown within the wall 216*a*. In some aspects, a roller holder bracket may be affixed via any of the holes and corresponding fasteners of the wall 216*b*. In some aspects, a portion of a hinge may be affixed to the wall 216*c* via any of the holes and corresponding fasteners. In some aspects, any of the hardware described herein may be affixed to any of the walls 216*a*, 216*b*, or 216*c*. It is additionally noted that the wall 215 may include similar holes configured to receive similar fasteners to affix various hardware to the endcap 210 and/or the section 192.

As additionally shown in FIG. 2, the wall 216*a* may include locking features 220 and the wall 216*c* may include locking features 222. Details of the locking features 220 and the locking features 222 will be described in greater detail with reference to FIGS. 5A-6B.

FIG. 3A is an exploded perspective view of an interior side of the section 192 of a movable barrier, according to aspects of the present disclosure. The view of the section 192 and corresponding endcaps 210 and 211 as shown in FIG. 3A provides an example of the section 192 and the endcaps 210 and 211 prior to assembly of the movable barrier.

As shown in FIG. 3A, the locking features 220 shown in FIG. 2 previously, may include a set of locking tabs 212 within the endcap 210 and a corresponding opening 194 within section 192. In some aspects, the endcap 210 and the section 192 may be sized and shaped such that when the endcap 210 is positioned to enclose the end of the section 192, the locking tabs 212 are positioned over, or aligned with, the opening 194. In some aspects, the opening 194 may alternatively be referred to as a hole, gap, space, orifice, or any other term.

Similarly, the set of locking features 222 shown and described with reference to FIG. 2 previously may include a set of locking tabs 213 within the endcap 210 and a corresponding opening 195 within the section 192. Similarly, when the endcap 210 is positioned to enclose the end of the section 192, the locking tabs 213 are positioned over, or aligned with, the opening 195. As explained previously, similar features are shown in the right endcap 211 and right end of the section 192.

FIG. 3A also illustrates multiple tabs 302. The tabs 302 may be positioned extending from any of the walls 216*a*. 216*b*, and/or 216*c* in a perpendicular direction from the section 192. These tabs 302 may include holes configured to receive fasteners which may couple the tabs 302 to the protrusions 199. In some aspects, by fixing these tabs 302 to the protrusions 199, the strength of the coupling of the endcap 210 to the section 192 may be increased.

FIG. 3B is an exploded perspective view of an exterior side of the section 192 of a movable barrier, according to aspects of the present disclosure. The view of FIG. 3B shows the outer surface 196 of the section 192. In some aspects, the surface 196 of the section 192 may be an exterior surface. For example, in implementations in which the movable barrier is in a closed position and the movable barrier separates an interior room or space from the environment of the exterior, the outer surface 196 may correspond to the exterior of the movable barrier, and the inner surface 193 may correspond to the interior of the movable barrier (see FIGS. 2-3A).

As additionally shown in FIG. 3B, the endcap 210 may include a wall 218. The wall 218 may be sized and shaped to overlap a portion of the outer surface 196 of the section 192. In some aspects, the wall 218 may similarly include any suitable holes or openings configured to receive fasteners for affixing the endcap 210 to the section 192. In some aspects, a length of the wall 218 may correspond to a height of the exterior surface 196. The wall 215, which is configured to overlap the end 197 of the section 192, is additionally shown in FIG. 3B.

Figure 4:
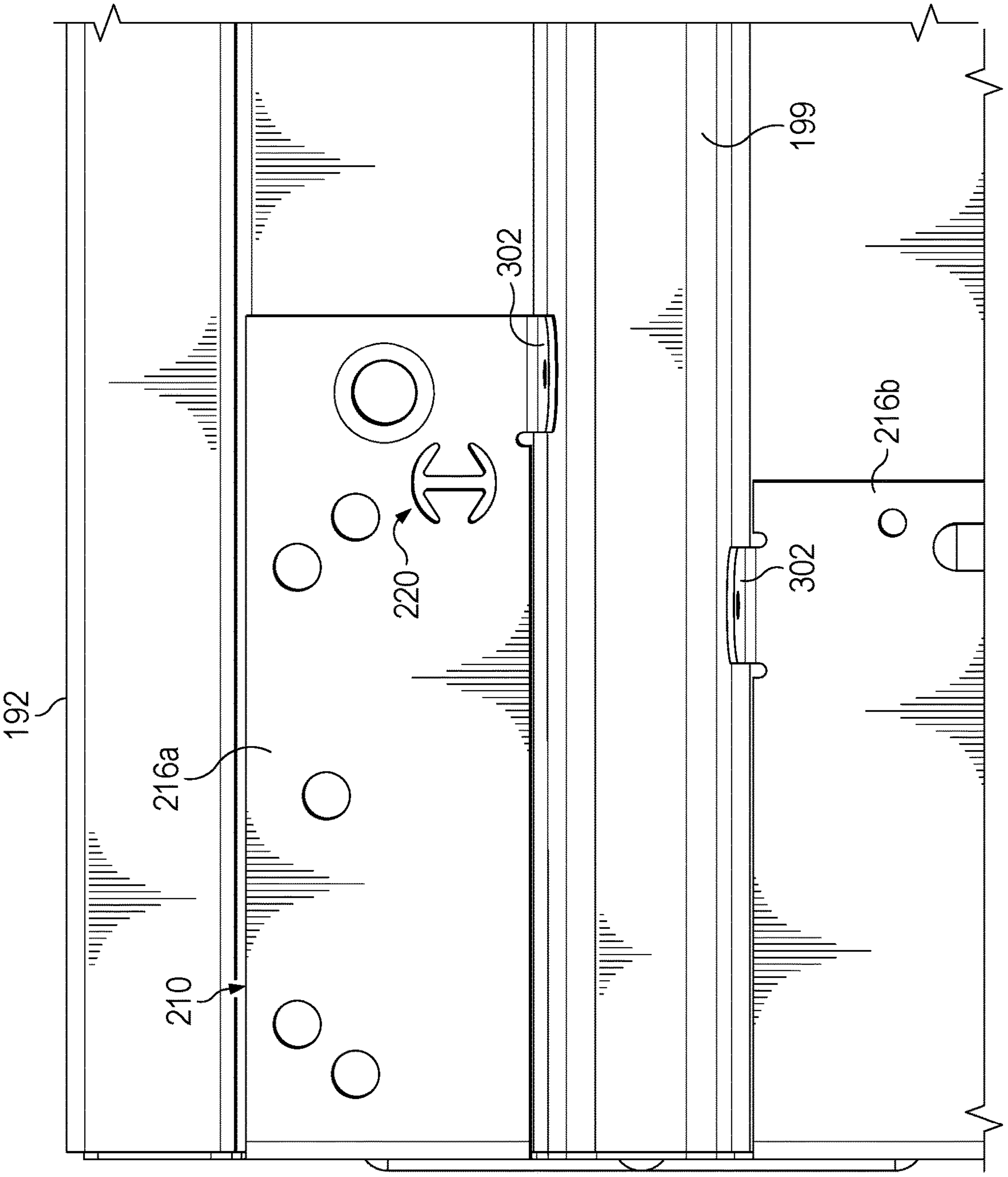
FIG. 4 is an enlarged side view of a portion of a section of a movable barrier, according to aspects of the present disclosure.

FIG. 4 is an enlarged side view of a portion of the section 192 of a movable barrier, according to aspects of the present disclosure. In FIG. 4, a top portion of the endcap 210 is shown, including the wall 216*a* and a portion of the wall 216*b*. The locking features 220 are also shown, including the locking tabs of the endcap 210 and the corresponding opening or hole within the section 192. Tabs 302 of the endcap 210 are also shown on top and bottom sides of the upper protrusion 199.

Figure 5A:
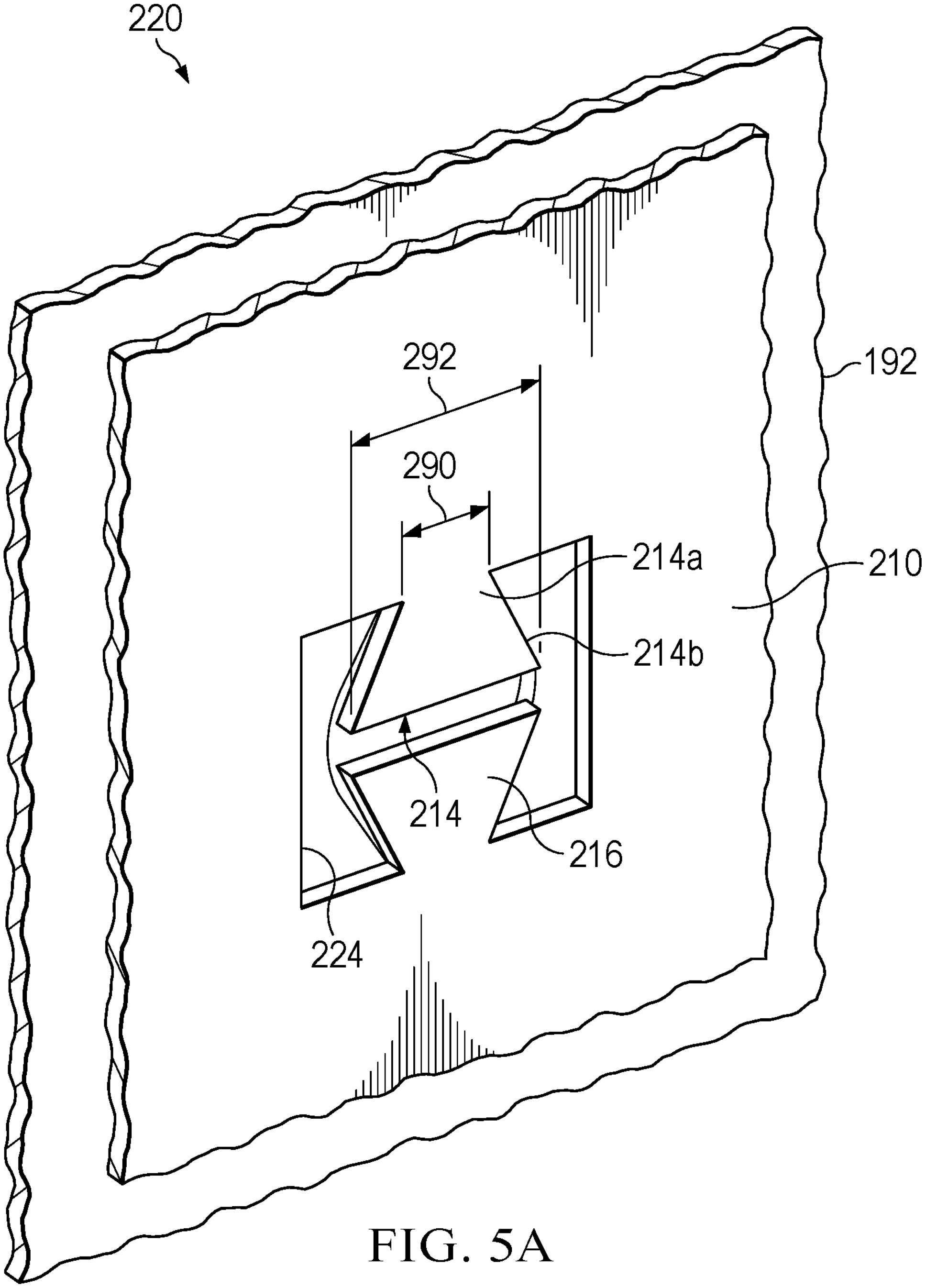
FIG. 5A is a front perspective view of interlocking tabs of an endcap aligned with an opening of a movable barrier prior to installation, according to aspects of the present disclosure.

FIG. 5A is a front perspective view of interlocking tabs 214 and 216 of the endcap 210 aligned with an opening 194 of a movable barrier prior to installation, according to aspects of the present disclosure. FIG. 5A may provide a detailed view of the locking features 220 and/or 222 shown in FIGS. 2-4.

As shown in FIG. 5A, the endcap 210 may include a hole 224. Multiple tabs may be positioned within the hole 224. For example, as shown in FIG. 5A, a tab 214 may extend from an inner edge of the hole 224 toward the center of the hole 224. Similarly, a tab 216 may extend from an opposite edge of the hole 224 toward the center of the hole 224. Although only two tabs (e.g., tab 214 and tab 216) are shown in FIG. 5A, any suitable number of tabs may be present within the hole 224. For example, only one tab may be provided within the hole 224, or three tabs, four tabs, or more tabs may be provided.

As shown in FIG. 5A, each tab 214 and 216 may be substantially similar. For example, the shape of the tab 214 may be the same as the shape of the tab 216. In other aspects, the shapes of the tabs 214 and 216 may differ from one another. For example, the tab 214 may be larger or smaller than the tab 216. In some aspects, as will be described in greater detail with reference to FIG. 5B, the shape of the tabs 214 may correspond to the shape of the opening 194 within the section 192. In the example shown in FIG. 5A, because the shape of the tab 214 is the same as the shape of the tab 216, features of the tabs 214 and 216 will be described with reference to the tab 214, but it is understood that any features described with reference to the tab 214 may equally apply to the tab 216.

In some aspects, the tab 214 may include a base 214*a* and a crown 214*b*. For the purposes of the present disclosure, the base 214*a* may be the proximal region of the tab 214. In other words, the tab 214 may could be connected to the remainder of the endcap 210 at the base 214*a*. The crown 214*b* may be the distal region of the tab 214. For example, the crown 214*b* may be the region of the tab 214 which extends towards the center of the hole 224. In some aspects, the crown 214*b* specifically refers to the distal-most edge of the tab 214.

As shown, the base 214*a* of the tab 214 and the crown 214*b* of the tab 214 may have varying widths. For example, the base 214*a* may be of a width 290. The crown 214*b* may be of a width 292. As shown in FIG. 5A, the width 292 of the crown 214*b* may be greater than the width 290 of the base 214*a*. In some aspects, and as shown in FIG. 5A, the region extending between the base 214*a* and the crown 214*b* may gradually increase or fan outward in a linear fashion such that the width of the tab 214 increases moving distally along the tab 214. In this way, the shape of the tab 214 may be generally triangular. In other aspects, the width of the tab 214 along the region between the base 214*a* and the crown 214*b* may transition from the width 290 to the width 292 in any other way. For example, the side surfaces of the tab 214 between the base 214*a* and the crown 214*b* may be curved or shaped in any other suitable way.

Figure 5B:
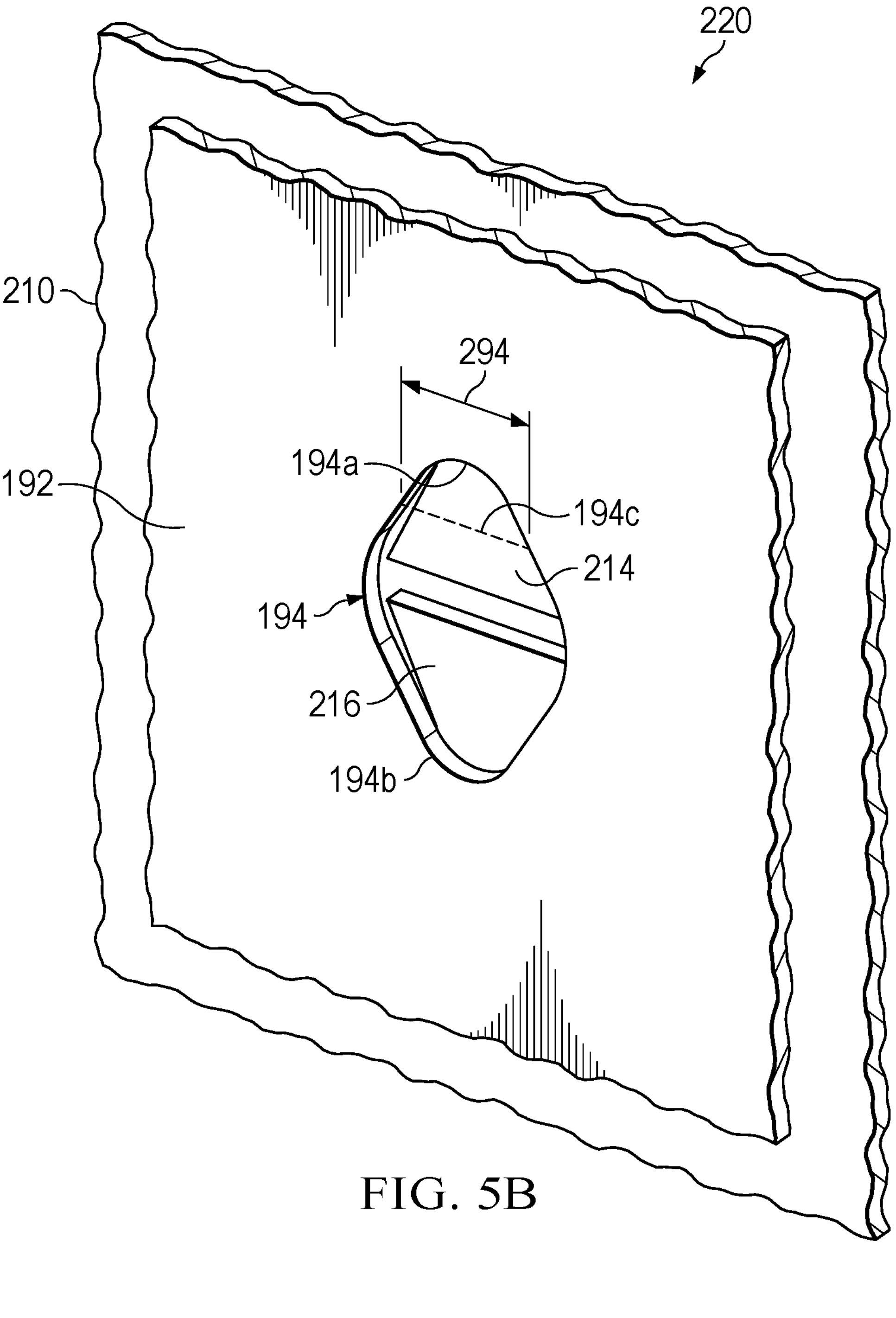
FIG. 5B is a rear perspective view of interlocking tabs of an endcap aligned with an opening of a movable barrier prior to installation, according to aspects of the present disclosure.

FIG. 5B is a rear perspective view of interlocking tabs 214 and 216 of the endcap 210 aligned with the opening 194 of a movable barrier prior to installation, according to aspects of the present disclosure. The view shown in FIG. 5B may be a view from within the section 192. For example, the section 192 shown in FIG. 5B may more specifically be a portion of the section 192 corresponding to an inner wall of the section 192. In that regard, the view of FIG. 5B may be a cutaway view in which the interior material of the section 192 has been removed allowing a view of the opening 194 within the section 192.

As shown in FIG. 5B, the opening 194 may be shaped as a rounded diamond. For example, the opening 194 may include four sides to form a diamond with rounded transitions between each of these four sides. In that regard, the opening 194 may have two ends 194*a* and 194*b*. The ends 194*a* and 194*b* may be positioned opposite of each other and may be the upper and lower ends of the rounded diamond shape of the opening 194. As shown, the end 194*a* may correspond to the tab 214. Similarly, the end 194*b* may correspond to the tab 216. In that regard, the size and shape of the ends 194*a* and 194*b* may be similar to aspects of the tabs 214 and 216. For example, a chord 194*c* is shown extending across the opening 194 at the end 194*a*. For the purposes of this disclosure, a chord may be a straight line across an opening. In that regard, the chord 194*c* may be a horizontal line extending from one side of the opening 194 to the other at or near the end 194*a*. As shown in FIG. 5B, the length 294 of this chord 194*c* may be equal to or similar to the width 290 of the base 214*a* of the tab 214. In some aspects, a similar chord of similar length may be associated with the lower end 194*b* of the opening 194 and may correspond to a similar width of the base of the tab 216.

As shown and described with reference to FIGS. 6A and 6B, these relative geometries, including the widths 292 and 290 of the tab 214 and the chord 194C, allows for the tabs 214 and 216 to be folded through the opening 194 and securing the endcap 210 to the section 192.

Figure 6A:
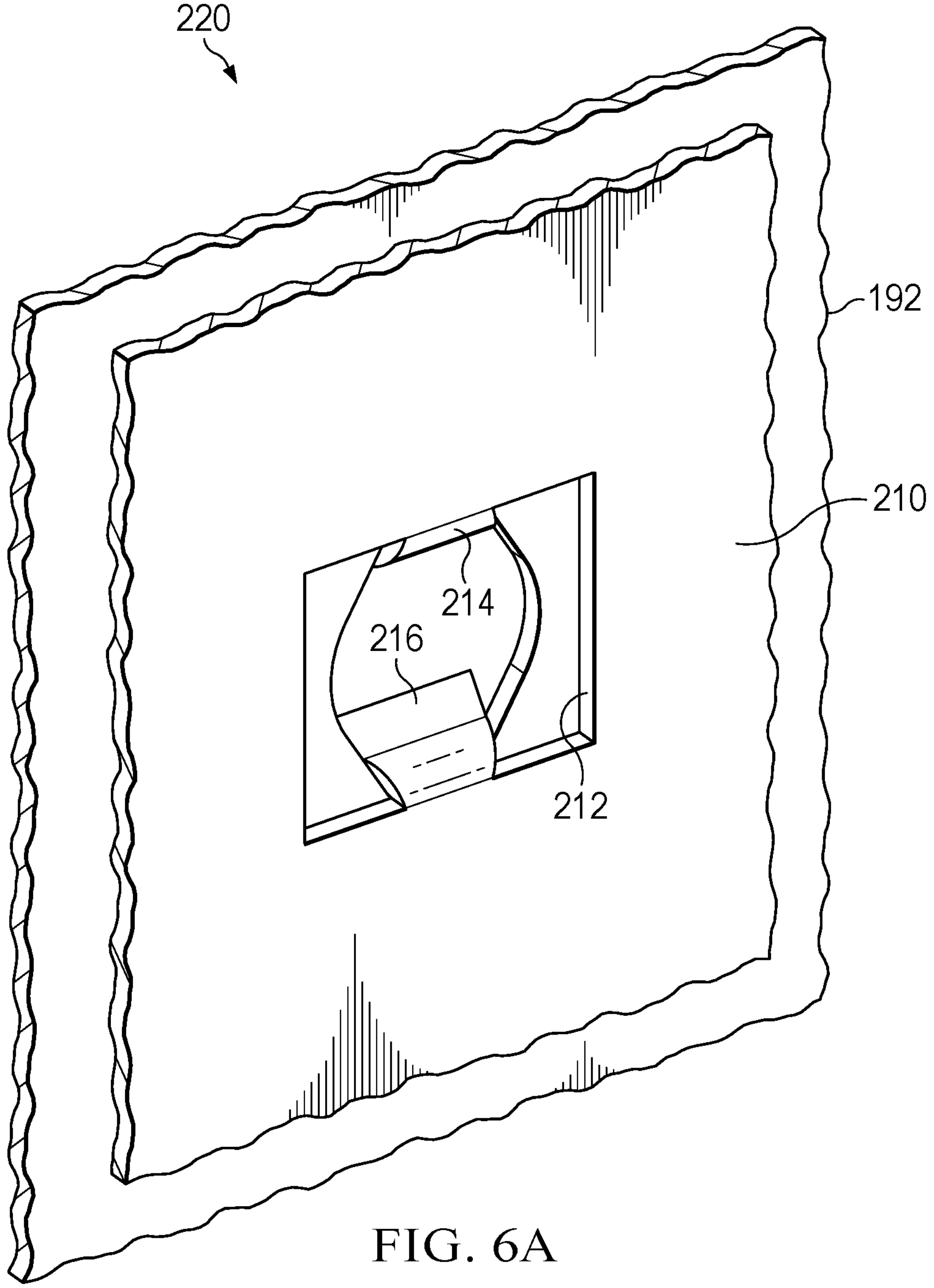
FIG. 6A is a front perspective view of interlocking tabs of an endcap aligned with an opening of a movable barrier after installation, according to aspects of the present disclosure.

FIG. 6A is a front perspective view of the interlocking tabs 214 and 216 of the endcap 210 aligned with the opening 194 of a movable barrier after installation, according to aspects of the present disclosure. FIG. 6A will be described in conjunction with FIG. 6B, which is a rear perspective view of the interlocking tabs 214 and 216 of the endcap 210 aligned with the opening 194 of a movable barrier after installation, according to aspects of the present disclosure.

Figure 6B:
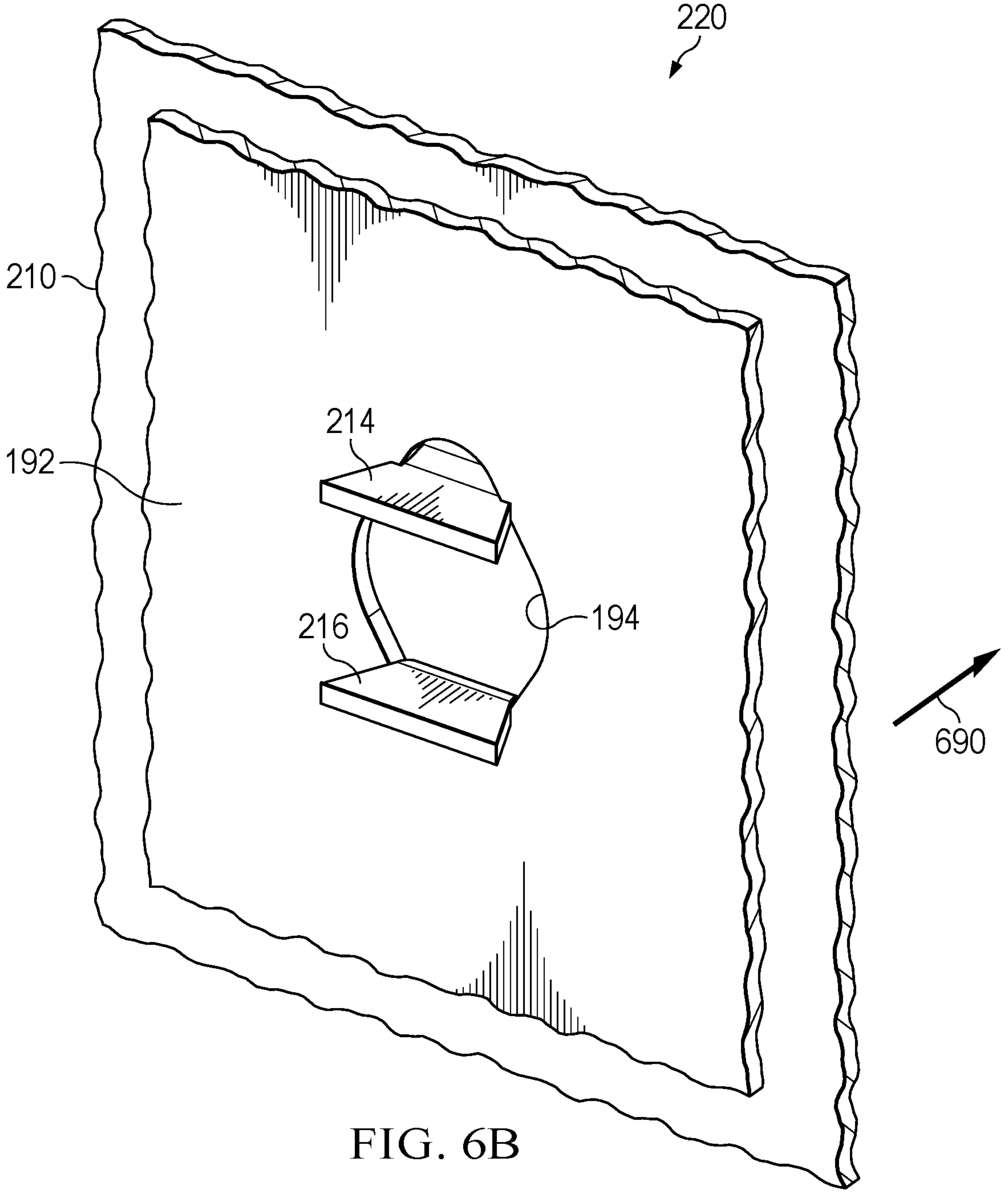
FIG. 6B is a rear perspective view of interlocking tabs of an endcap aligned with an opening of a movable barrier after installation, according to aspects of the present disclosure.

As shown in FIGS. 6A and 6B, an installer of the endcap 210 may fold the tabs 214 and 216 through the opening 194 of the section 192 to affix the endcap 210 to the section 192.

In some aspects, referring back to FIG. 5A, because the width 292 of the crown to 214*b* is greater than the width 290 of the base 214*a* as well as the length of the chord 194*c* of the opening 194, after the tabs 214 and 216 are folded through the opening 194, the tabs 214 and 216 may not be pulled in a direction 690 back through the opening 194. In this way, the endcap 210 is coupled to the section 192 because the tabs 214 and 216 interlock with the opening 194. In that regard, the only way to remove the endcap 210 from the section 192 is to fold the tabs 214 and 216 in a reverse direction back into the position shown in FIGS. 5A and 5B. At this point, the endcap 210 may be removed in the direction 690 from the section 192.

As shown in FIGS. 5A-6B, each tab of the set of tabs within the endcap 210 (e.g., the tabs 214 and 216) may correspond to a rounded corner of the opening 194. In that regard, the tab 214 corresponds to the end 194*a* of the opening 194 and the tab 216 may correspond to the end 194*b* of the opening 194. In other aspects, additional tabs may be included in the set of interlocking tabs. For example, if three tabs are present within a set of interlocking tabs, these three tabs may be arranged equidistant from one another around a hole within the endcap 210. In that regard, the corresponding hole within the section 192 may be of a rounded triangular shape. In that sense, the opening within the section 192 may include three rounded corners corresponding to the three tabs of the set of interlocking tabs. Similarly, if four tabs are included in the set of locking tabs of the endcap 210, four rounded corners forming a rounded square shaped hole within the section 192 may be present. Similarly, any number of interlocking tabs and corresponding rounded corners of a corresponding shape of the opening within the section 192 are anticipated. In some aspects, increasing the number of interlocking tabs of the set of interlocking tabs may increase the strength of the bond between the endcap 210 and the section 192. For example, additional tabs may be included to resist movement of the endcap 210 in various directions relative to the section 192.

It is noted, that the installer of the endcap 210 may fold the tabs, such as the tabs 214 and 216 shown, in any suitable way or with any suitable tools. For example, a punch may be used to force the tabs 214 and 216 through the opening 194. In some aspects, the punch may be sized and shaped according to the opening 194 and/or the tabs 214 and 216. In some aspects, other conventional tools may be used to fold the tabs 214 and 216 through the opening 194, such as a screwdriver, hammer, pliers, or any other suitable tools. In some aspects, the installer may use a manually operated tool, such as a hand tool, or may use a pneumatic or powered tool.

Aspects of the present invention may provide several advantages over the prior art. For example, the interlocking tabs disclosed allow the endcap 210 to be affixed to the section 192 without any hardware additional to the endcap 210 and the section 192. In particular, no screws, bolts, adhesives, or any other methods of attaching the two components are required. While such hardware may be used if the installer desires, for example to increase the strength of the connection between the endcap 210 and section 192, they are not necessary. In some aspects, the endcap 210 may be affixed to the section 192 by the interlocking tabs and opening alone. In other aspects, the interlocking tabs and opening may be configured to hold the endcap 210 in position while the installer positioned fasteners in place.

Because no hardware is needed to secure the endcap 210 to the section 192, the labor required to secure the endcap 210 to the section 192 is more streamlined and inventory for parts needed for installation is reduced. In addition, weight of the movable barrier as a whole is decreased. In some aspects, the interlocking features of the tabs and corresponding opening are also less prone to failure than traditional fasteners, such as a self-tapping screw. For example, if a movable barrier needs to be service, and self-tapping screws are removed from the section 192 to remove the endcap 210, threads of the screw and/or features of the head of the screw are prone to be stripped preventing the removal of the endcap at all or reinstallation of the endcap as needed. In contrast, the interlocking features described herein may be easily folded and unfolded as needed without the risk of stripping necessary features of the attachment system.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An endcap configured to enclose an end of a movable barrier, comprising:
- an endcap wall alignable with a surface of the movable barrier such that the endcap encloses the end of the movable barrier, the endcap wall comprising:
  - a first set of folding tabs extending from the endcap wall and alignable with a first opening of the movable barrier, wherein the first set of folding tabs are foldable within the first opening of the movable barrier in a manner connecting the endcap to the movable barrier preventing movement of the first set of folding tabs through the first opening and away from the movable barrier.

2. The endcap of claim 1, further comprising a plurality of holes configured to receive fasteners further affixing the endcap to the movable barrier.

3. The endcap of claim 2, wherein at least one hole of the plurality of holes is alignable with a hinge.

4. The endcap of claim 1, wherein the first set of folding tabs includes a first tab and a second tab alignable with the opening of the movable barrier, and the first tab and the second tab each foldable within the opening of the movable barrier.

5. The endcap of claim 4, wherein the endcap wall further comprises a second set of tabs alignable with a second opening of the movable barrier, wherein the second set of tabs are foldable within the second opening of the movable barrier.

6. The endcap of claim 4, wherein a shape of the first tab corresponds to a shape of the opening of the movable barrier, such that when the first tab is folded within the opening, the endcap is affixed to the movable barrier.

7. The endcap of claim 6, wherein the first tab includes a base and a crown, wherein a width of the crown is greater than a width of the base.

8. The endcap of claim 7, wherein, when the endcap is aligned with the movable barrier, the width of the base of the first tab is equal to a length of a chord extending across the opening of the movable barrier at a corresponding position of the base of the first tab.

9. A movable barrier comprising:

a section comprising:

an end;

an outer surface corresponding to an exterior side of the movable barrier;

an inner surface opposite the outer surface and corresponding to an interior side of the movable barrier, the inner surface including a first hole; and an endcap comprising:

an endcap wall configured to overlap a portion of the inner surface of the section, the endcap wall comprising a first set of folding tabs sized and positioned to align with the first hole and foldable through the first hole to affix the endcap to the section such that the first set of folding tabs is prevented from moving through the first hole and away from the movable barrier.

10. The movable barrier of claim 9, further comprising a second set of folding tabs sized and positioned to align with a second hole within the inner surface of the section, the second set of folding tabs configured to be foldable through the second hole.

11. The movable barrier of claim 9, wherein the endcap further comprises a plurality of holes configured to receive a corresponding plurality of fasteners to further affix the endcap to the movable barrier.

12. The movable barrier of claim 9, further comprising a hinge coupled to the endcap.

13. The movable barrier of claim 9, wherein the first set of tabs includes at least two tabs.

14. The movable barrier of claim 13, wherein a shape of the first hole is a rounded diamond comprising two ends.

15. The movable barrier of claim 14, wherein each tab of the first set of tabs includes a base and a crown, each base alignable with an end of the first hole.

16. The movable barrier of claim 15, wherein a width of the base of each tab of the first set of tabs corresponds to a chord of the first hole.

17. A method of affixing the endcap of claim 1 to a movable barrier comprising:

positioning the endcap relative to the movable barrier such that the endcap encloses an end of the movable barrier;

aligning a first set of tabs of the endcap with a first hole of the movable barrier; and folding the first set of tabs of the endcap through the first hole of the movable barrier such that the first set of tabs is prevented from moving through the first hole and away from the movable barrier.

18. The method of claim 17, further comprising:

aligning a second set of tabs of the endcap with a second hole of the movable barrier; and folding the second set of tabs of the endcap through the second hole of the movable barrier.

19. The method of claim 17, wherein each tab of the first set of tabs includes a base and a crown.

20. The method of claim 19, wherein a width of a crown of each tab of the first set of tabs is greater than:

a width of a base of each tab of the first set of tabs; and a length of a chord of the first hole.

* * * * *